United States Patent
Nagano et al.

[11] Patent Number: 5,148,302
[45] Date of Patent: Sep. 15, 1992

[54] OPTICAL MODULATION ELEMENT HAVING TWO-DIMENSIONAL PHASE TYPE DIFFRACTION GRATING

[76] Inventors: Akihiko Nagano; Etsuro Kishi; Ryoji Fujiwara; Yukitoshi Ohkubo; Michiyo Nishimura; Hajime Sakata; Takayuki Ishii; Masato Yamanobe, all of c/o Canon Kabushiki Kaisha 30-2, 3-chome, Shimomaruko, Ohta-ku, Tokyo, Japan

[21] Appl. No.: 771,532

[22] Filed: Oct. 7, 1991

Related U.S. Application Data

[63] Continuation of Ser. No. 587,163, Sep. 21, 1990, abandoned, which is a continuation of Ser. No. 36,552, Apr. 9, 1987, abandoned.

[30] Foreign Application Priority Data

| Apr. 10, 1986 | [JP] | Japan | 60-82522 |
| Jun. 12, 1986 | [JP] | Japan | 60-136869 |
| Apr. 7, 1987 | [JP] | Japan | 61-85266 |
| Apr. 7, 1987 | [JP] | Japan | 61-85267 |

[51] Int. Cl.$^5$ .............................. G02F 1/13
[52] U.S. Cl. .............................. 359/95; 359/81; 359/82; 359/94
[58] Field of Search ............ 350/348, 344, 347 V, 350/346, 162.2

[56] References Cited

U.S. PATENT DOCUMENTS

| 3,843,231 | 10/1974 | Borel et al. | 350/348 |
| 3,877,790 | 4/1975 | Robinson | 350/344 |
| 4,251,137 | 2/1981 | Knop et al. | 350/347 V |
| 4,729,640 | 3/1988 | Sakata | 350/347 V |
| 4,751,509 | 6/1988 | Kubota et al. | 350/348 |
| 4,850,681 | 7/1989 | Yamanobe et al. | 350/348 |
| 4,913,531 | 4/1990 | Efron et al. | 350/348 |

FOREIGN PATENT DOCUMENTS 0003928 1/1978 Japan .

Primary Examiner—Stanley D. Miller
Assistant Examiner—Trong Phan

[57] ABSTRACT

An optical modulation element characterized in that a two-dimensional phase type diffraction gratings, whose refractive index changes for each predetermined period along two different directions in a predetermined plane, is adopted, and a changing state of the refractive index is controlled to change characteristics of the diffraction grating, so that a diffraction phenomenon of light incident on the element is controlled.

29 Claims, 8 Drawing Sheets

OPTICAL MODULATION ELEMENT HAVING TWO-DIMENSIONAL PHASE TYPE DIFFRACTION GRATING

This application is a continuation of application Ser. No. 587,163, filed Sep. 21, 1990, now abandoned, which is a continuation of application Ser. No. 036,552, filed Apr. 9, 1987, now abandoned.

BACKGROUND OF THE INVENTION

1. Field of the Invention

The present invention relates to an optical modulation element and, more particularly, to an optical modulation element which is most suitable for an optical display apparatus, an optical recording apparatus, a photo-coupling apparatus, an optical communication apparatus, an optical calculation apparatus, and the like, wherein a diffraction phenomenon of a diffraction grating is controlled utilizing a diffraction grating and a variable refractive index material such as a liquid crystal, and optical modulation such as light transmission or light shielding is performed.

2. Related Background Art

A conventional well-known optical modulation element is a so-called TN (twisted nematic) type liquid crystal display element which consists of a pair of polarizing plates arranged such that their polarizing directions are perpendicular to each other, and an element which is arranged between the pair of polarizing plates and consisted of a liquid crystal sealed between the substrate surfaces on opposing substrate surfaces of a pair of transparent substrates and made an orientation treatment having orthogonal each other. The orientation state of the liquid crystal is switched between a twisted state and a state perpendicular to the substrate surface, thereby modulating incident light. A display element of this type is widely used since its construction is simple and it can be easily driven However, since this display element transmits and shields light by utilizing two polarizing plates, its transmission rate during bleaching, i.e., during light transmission is poor. Therefore, this element is not a preferable optical modulation element in terms of light utilization efficiency.

A so-called guest-host liquid crystal display element in which dyes are mixed in liquid crystal molecules is known as another display element of the same type which utilizes a liquid crystal. However, because of the presence of the dyes, this display element has a transmission property during bleaching as low as about 75% at maximum.

Japanese Patent Examined Publication No. 3928/1978 U.S. Pat. No. 4,251,137, and so on, disclose a display element or a variable subtractive process filter element wherein a reflective type or transmitting type phase diffraction grating is combined with a liquid crystal. The elements disclosed in these articles have good light utilization efficiency. However, the element disclosed in Japanese Patent Examined Publication No. 3928/1978 has a mere ornamental effect and is not satisfactory as a display element for displaying letters and pictures and an optical modulation element for transmitting or shielding light beam. The variable subtractive process filter disclosed in U.S. Pat. No. 4,251,137 includes first and second apparatuses. In the first apparatus, a variable refractive index material such as a liquid crystal is filled between substrates, at least one of which has an optically isotropic diffraction grating structure. An electric field is applied to the liquid crystal to change a refractive index of the liquid crystal, thereby performing optical modulation by utilizing a diffraction effect of the diffraction grating. In the second apparatus, diffraction gratings are formed on a pair of opposing substrate surfaces such that their orientation directions are perpendicular to each other. A liquid crystal is filled between these substrates. And by controlling the orientation of the liquid crystal molecules and changing the refraction index of the filter element, the difference in refraction index between the material constituting the diffraction gratings and the liquid crystal is changed, thereby the spectral transmission rate characteristics being able to be changed. However, although the first apparatus has high light utilization efficiency and has high performance as the variable subtractive process filter, it cannot cope with modulation of incident light having arbitrary polarization components, and hence, the second apparatus is disclosed.

In the second apparatus, since the diffraction gratings are formed on the pair of opposing substrate surfaces whose orientation directions are perpendicular to each other, the second apparatus has a distance, i.e., a cell gap more than twice that of the diffraction grating of the first variable subtractive process filter, and causes the intensity of the electric field as the refractive index control means of the variable refractive index material to be decreased to $\frac{1}{2}$ or less. Since the two diffraction gratings are superposed on each other, the orientation directions of the liquid crystal molecules at a boundary region are disordered, and an effective diffraction grating height is decreased. Since the two diffraction gratings are superposed on each other, the second apparatus requires the number of manufacturing processes more than twice that of the first apparatus, resulting in high cost.

When the above-mentioned technique is applied to an optical display apparatus for independently controlling respective portions, such that a pattern or dots are formed on a portion of the diffraction grating or individual patterns are formed by the diffraction grating, excluding a case wherein uniform, constant control is performed in an identical plane, as in the filter disclosed in U.S. Pat. No. 4,251,137, the two diffraction gratings must precisely overlap each other, and the entire apparatus and a control system for the liquid crystal tend to become complicated.

SUMMARY OF THE INVENTION

It is an object of the present invention to provide an optical modulation element utilizing a diffraction phenomenon, which is free from the conventional drawbacks, can facilitate its manufacturing processes and arrangement, and always has high light utilization efficiency regardless of a polarizing state of incident light.

In order to achieve the above object of the present invention, an optical modulation element is characterized in that a two-dimensional phase type diffraction grating, whose refractive index changes for each predetermined period along two different directions in a predetermined plane, is adopted, and a changing state of the refractive index is controlled to change characteristics of the diffraction grating, so that a diffraction phenomenon of light incident on the element is controlled.

In order to achieve the above object, according to an aspect of the present invention, an optical modulation element, which has two substrates, a diffraction grating arranged between the substrates, a variable refractive index material for filling gaps between the diffraction grating and the substrates, and a member for controlling a refractive index of the variable refractive index material, is characterized in that the diffraction grating comprises a plurality of three-dimensional shaped optical members having checkerboard-like patterns in a plane parallel to the substrate surface.

According to another aspect of the present invention, an optical modulation element is characterized in that a plurality of diffraction grating blocks are formed on a substrate, directions of grating grooves of the respective blocks are different from each other to be randomly oriented as a whole, and a variable refractive index material is sealed in the groove portion of the diffraction grating in each block to constitute a two-dimensional phase type diffraction grating.

In the present invention, the variable refractive index material is a material having a birefringence such as liquid crystal.

DESCRIPTION OF THE PREFERRED EMBODIMENTS

Figure 1:
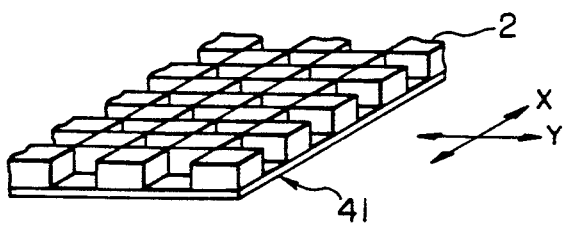
FIG. 1 is a partial schematic view showing an embodiment of an optical modulation element according to the present invention, i.e., showing a two-dimensional phase type diffraction grating.

FIG. 1 is a perspective view of a diffraction grating as a part of an optical modulation element according to the present invention. In this embodiment, a diffraction grating is constituted by a plurality of three-dimensional optical members 2 which are aligned regularly in the X and Y directions in a plane on a transparent substrate 41. The optical members 2 have substantially the same height, are arranged in a checkerboard-like matrix, and have a light transmission property.

Figure 2A:
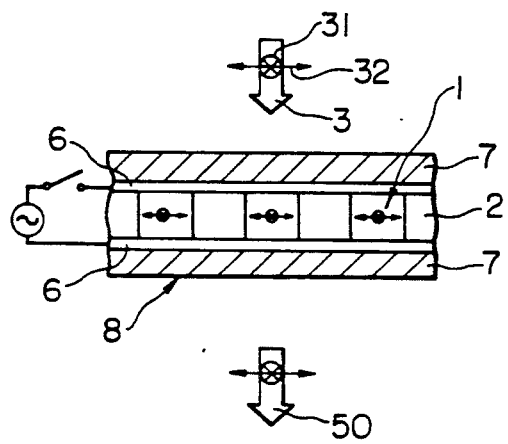
FIGS. 2A and 2B are partial sectional views, taken along an X or Y direction of an element having a diffraction grating shown in FIG. 1, for explaining modulation principle of the optical modulation element of the present invention.
Figure 2B:
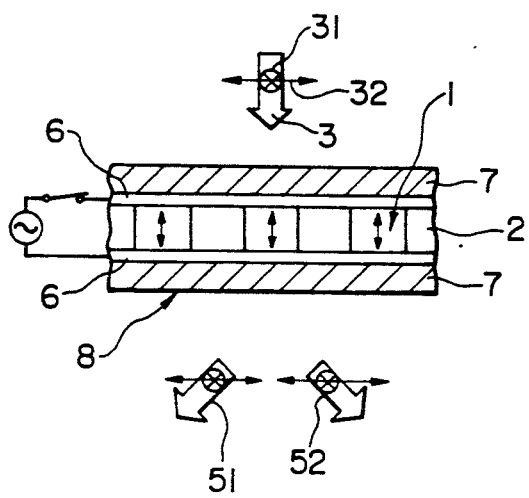

FIGS. 2A and 2B are sectional views showing an element having the diffraction grating shown in FIG. 1 and for explaining the operation principle of an optical modulation element 8 in the embodiment shown in FIG. 1. FIG. 2A shows a case wherein no electric field is applied to a nematic liquid crystal 1 (to be described later), and FIG. 2B shows a case wherein an electric field is applied thereto.

A phase type diffraction grating is constituted by the nematic liquid crystal 1 having a positive dielectric anisotropy, and the diffraction grating 2. The optical modulation element of this embodiment includes transparent electrodes 6, and transparent substrates 7. Light components become incident on the element, as indicated by 3 in FIG. 2A, and light components are emitted from the element as indicated by 50, 51, and 52.

In this embodiment, as shown in FIG. 2A, when no electric field is applied to the liquid crystal 1, orientations of the nematic liquid crystal 1 having a positive dielectric anisotropy depend on the shapes of recesses of the diffraction grating 2. However, in the case that the liquid crystal molecules are oriented in random directions in the plane parallel to the transparent electrodes 6, when two light components (a light component 31 which is polarized in a direction perpendicular to the director of the liquid crystal and is perpendicular to the sheet (drawing) surface and a light component 32 which is parallel to the sheet surface), i.e., light beams having arbitrarily polarized components, become incident on the optical modulation element 8, an apparent refractive index of the liquid crystal 1 with respect to light components 31 and 32 transmitted through the grooves of the diffraction grating 2 is a mean value $(n_e + n_o)/2$ of an extraordinary refractive index $n_e$ and an ordinary refractive index $n_o$. A refractive index $n_g$ of a material of the diffraction grating 2 is given as:

$$n_g = (n_e + n_o)/2$$

Therefore, the optical modulation element 8 can be considered as a substantially isotropic member with respect to the incident light components 31 and 32. As a result, the incident light components 31 and 32 are transmitted through the optical modulation element 8 as an output light component 50 without being diffracted. More specifically, in the optical modulation element 8, if no electric field is applied to the liquid crystal 1, the incident light components 31 and 32 are not changed, and a non-display state, i.e., a normally-open state, is set.

When an electric field is applied to the liquid crystal 1 through the transparent electrodes 6 as a part of the control means, as shown in FIG. 2B, the liquid crystal 1 are homeotropically oriented. When light components 31 and 32 having the same polarization characteristics as described above are incident on the optical modulation element 8, the refractive index of the liquid crystal 1 for these light components is influenced by the ordinary refractive index $n_o$.

Light components transmitted through projecting portions of the diffraction grating 2 have the refractive index $n_g$. Since $n_g \cdot n_o$, a phase difference is caused between the light components transmitted through the projecting portions of the diffraction grating 2 and the light components transmitted through the liquid crystal portions, and the incident light components 31 and 32 diffracted.

Since the diffraction grating 2 of this embodiment consists of checkerboard-like three-dimensional portion, a diffraction phenomenon occurs regardless of the polarized direction of the incident light components.

In this embodiment, when the electric field is applied to the liquid crystal 1, the grating member constituted by the liquid crystal 1 and the diffraction grating 2 serves as the diffraction grating. Thus, the incident light components 31 and 32 are diffracted and output, and are converted to the output light components and 52. More specifically, in the optical modulation element 8, when the electric field is applied to the liquid crystal linear components of the incident light components 31 and 32 are eliminated, and a light diffracted state can be achieved.

Figure 3A:
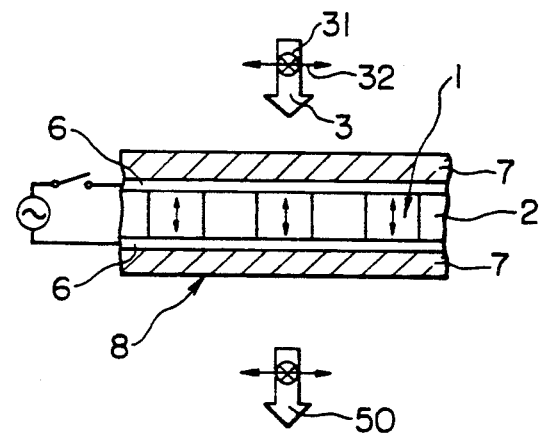
FIGS. 3A and 3B are partial sectional views showing another embodiment of an optical modulation element according to the present invention and for explaining a modulation principle.
Figure 3B:
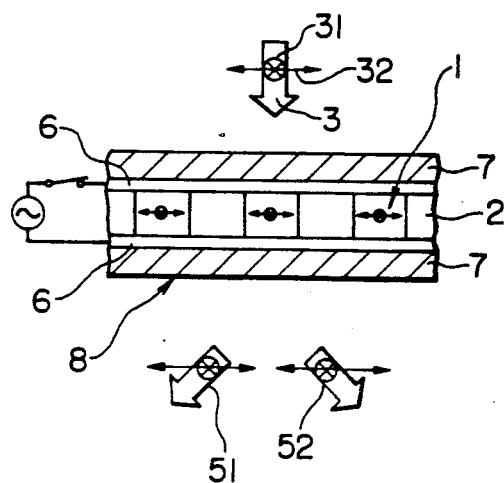

FIGS. 3A and 3B are for explaining the operation principle in an optical modulation element according to another embodiment of the present invention. In this embodiment, a nematic liquid crystal having a negative dielectric anisotropy is used instead of the nematic liquid crystal having the positive dielectric anisotropy used in FIG. 2.

FIG. 3A illustrates a case wherein no electric field is applied to the liquid crystal 1, and FIG. 3B illustrates a case wherein an electric field is applied to the liquid crystal 1.

In this embodiment, when no electric field is applied to the liquid crystal 1, as shown in FIG. 3B the liquid crystal 1 having the negative dielectric anisotropy is homeotropically oriented in the recesses of the diffraction grating 2. Assume that light components 31 and 32 having the same polarization characteristics, i.e., light components having arbitrarily polarized components are incident on the optical modulation element 8. Of the light components 31 and 32, light components transmitted through the grooves of the diffraction grating 2 are influenced by the ordinary refractive index $n_o$ of the diffraction grating 2. and light components transmitted through the projecting portion of the diffraction grating 2 are influenced by the refractive index $n_g$ of the diffraction grating 2.

Since the liquid crystal 1 and the diffraction grating 2 are designed to yield $n_o = n_g$, no phase difference is caused between light components transmitted through the liquid crystal portion and projection portion of the diffraction grating. For this reason, the incident light components 31 and 32 are transmitted through the optical modulation element 8 as output light 50 without being diffracted. That is, a normally-open state is established.

When an electric field is applied to the liquid crystal 1 through the transparent electrodes 6 as a part of a control means, as shown in FIG. 3B, the orientation directions of the liquid crystal molecules 1 depend on the shapes of the recesses. However, in the case wherein the liquid crystal molecules 1 are oriented in random directions in a plane parallel to the transparent electrodes 6, when the light components 31 and 32 having the same polarization characteristics as described above are incident on the light modulation element, these light components are influenced by the extraordinary refractive index $n_e$ and the ordinary refractive index $n_o$ of the liquid crystal 1. Therefore, an apparent refractive index of the liquid crystal 1 becomes a mean value $(n_e + n_o)/2$ of the extraordinary refractive index $n_e$ and the ordinary refractive index $n_o$.

Since light components transmitted through the projecting portion of the diffraction grating 2 are influenced by the refractive index $n_g$, and are designed to yield $n_g \cdot (n_e + n_o)/2$, a phase difference is caused between themselves and light components transmitted through the liquid crystal portion. Therefore, the incident light components 31 and 32 are transmitted as output light components 51 and 52.

That is, a light diffraction state can be established.

In the above embodiments, as the light-transmission three-dimensional members, cylindrical members, or asymmetrical members, such as polygonal members, elliptic members, rectangular members, and the like, may be used instead of quadrangular-prism shaped members, as needed.

In the above embodiments, a light transmission type optical modulation element has been described. For example, one substrate may comprise a light reflection film to constitute a reflection type element. In the case of the reflection type element, behavior of diffracted light components in the element becomes complicated. Therefore, in consideration of design or practical applications of display elements, a transmission type optical modulation element is preferable in the present invention. In this case, a diffraction grating, a variable refractive index material, and substrates consist of members having a transmission property with respect to a used wavelength.

According to the above embodiment, when optical modulation is performed by utilizing a liquid crystal and a diffraction grating, since the diffraction grating is constituted by checkerboard-like three-dimensional optical members in a plane, incident light components having arbitrarily polarized components can be satisfactorily optically modulated. In addition, an optical modulation apparatus having the following advantages can be achieved. That is, an increase in cell gap can be prevented, and an electric field can be effectively applied to the liquid crystal, a decrease in effective height of the diffraction grating can be prevented. At the same time, a normally-open state can be established.

Figure 4A:
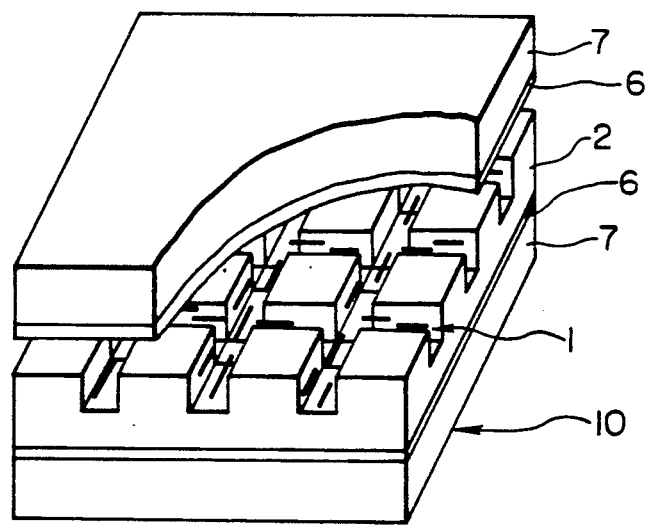
FIG. 4A is a schematic perspective view showing an embodiment when the present invention is applied to a transmission type display apparatus.

FIG. 4A is a perspective view of an embodiment when the present invention is applied to a transmission type display apparatus. In FIG. 4A, an optical display apparatus 10 includes a diffraction grating 2 having a two-dimensional structure. The diffraction grating 2 comprises a fine relief grating having a two-dimensional periodic structure, as in FIG. 1. More specifically, the diffraction grating 2 comprises three-dimensional portions regularly arranged in an identical plane.

A medium 1 having a refractive index anisotropy is sealed in recesses of the diffraction grating 2. In this embodiment, the medium 1 is a positive nematic liquid crystal.

Transparent electrode layers 6 are adapted to apply an electric field to the liquid crystal 1. Glass substrates 7 are respectively formed on the electrode layers 6.

In this embodiment, since a transmission type display is performed, components are formed of a transparent material which does not absorb light in a visible region, and a refractive index n of the grating material of the diffraction grating 2 is designed to substantially coincide with the ordinary refractive index $n_o$ of the liquid crystal over the visible region.

In this embodiment, a color, contrast, and the like of a display state are set by adjusting the shape of the grating 2 (in particular, the height of projecting portion, a ratio of the projecting portion to the recesses), the refractive indexes of the respective members of the diffraction grating 2 and the liquid crystal 1, and the like.

In this embodiment, the grating pitch of the diffraction grating 2 is preferably several micrometers ($\mu$m) so that a diffracted light component of 0th order and diffracted light component of higher orders are separated from each other.

Figure 4B:
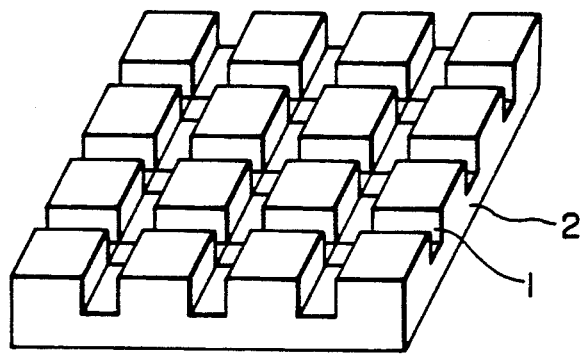
FIG. 4B is a perspective view showing an example of a diffraction grating in the apparatus shown in FIG. 4A.
Figure 4C:
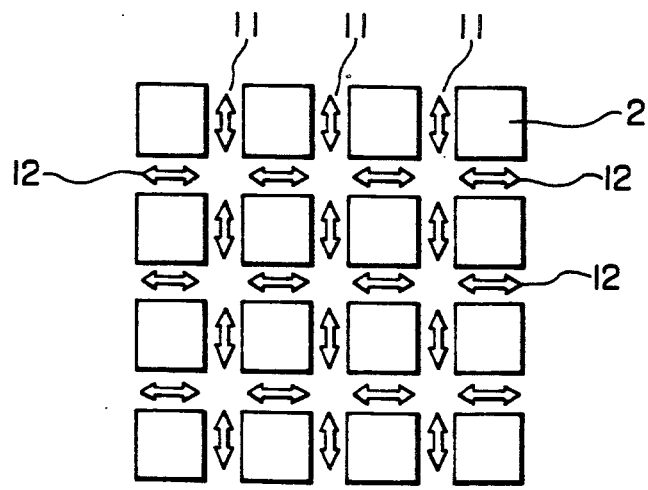
FIG. 4C is a view for explaining orientation directions of liquid crystal molecules (optical axis directions) sealed in a groove portion of the diffraction grating shown in FIG. 4B.

FIGS. 4B and 4C are respectively a perspective view of the diffraction grating 2 in the optical display apparatus shown in FIG. 4A and a view for explaining optical axes of the liquid crystal molecules in the grooves of the diffraction grating 2.

In FIG. 4C, directions of the optical axes of the liquid crystal molecules 1 are indicated by numerals 11 and 12.

In this embodiment, the optical axes 11 and 12 of the liquid crystal 1 are periodically oriented to be perpendicular to each other in an identical plane, thereby forming an isotropic grating with respect to white incident light.

Referring to FIG. 4B, each projecting portion of the diffraction grating has a square shape so that the optical axes of the liquid crystal 1 are parallel to corresponding sides of the square, as shown in FIG. 4C. The optical axes are oriented, as shown in FIG. 4C, using the nematic liquid crystal 1. More specifically, when the nematic liquid crystal 1 is sealed in the grooves of the grating 2, the liquid crystal 1 tend to be automatically oriented by walls of the grating 2. Therefore, the orientation shown in FIG. 4C can be achieved.

A principle will now be described, wherein the formation state of the grating 2 in this embodiment allows an isotropic display with respect to white incident light.

FIGS. 5A to 5E illustrate examples of refractive index distributions of the grating with which incident light is influenced, when incident light is separated into polarized components having two orthogonal oscillation directions, and one polarized component, in particular, a polarized component 3 perpendicular to one periodic direction, is taken into consideration. In FIGS. 5A to 5E, a refractive index of the grating is indicated by n, and ordinary and extraordinary refractive indexes of the liquid crystal are indicated by $n_o$ and $n_e$, respectively.

Figure 5A:
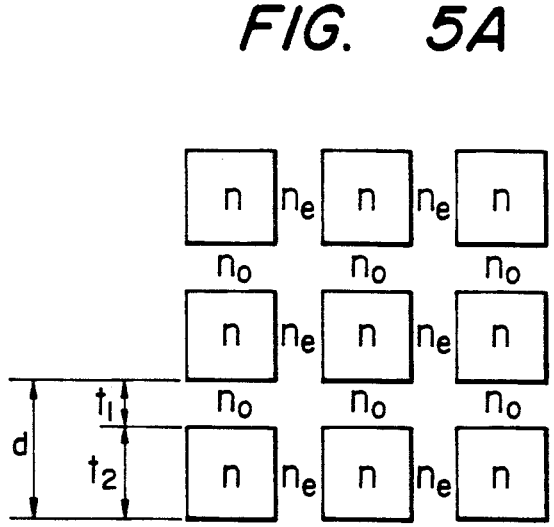
FIGS. 5A to 5E are views for explaining refractive index distributions which depend on the orientation directions of the liquid crystal molecules of the apparatus shown in FIG. 4A and are sensed by linearly polarized light beams incident on the apparatus at a light transmission region.
Figure 5C:
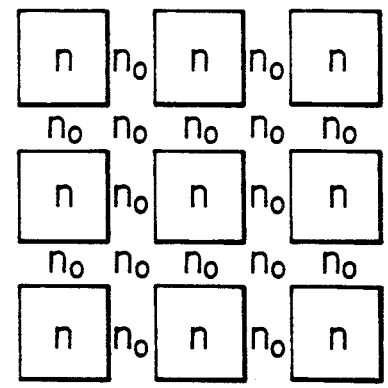
Figure 5B:
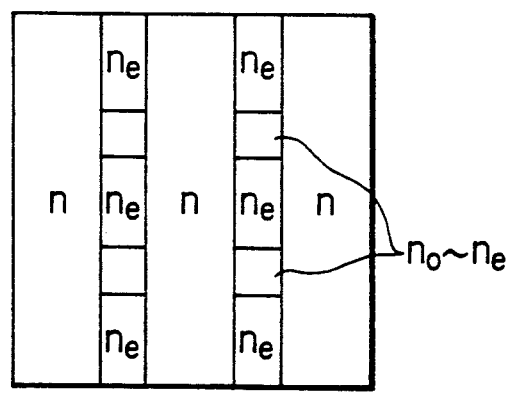
Figure 5D:
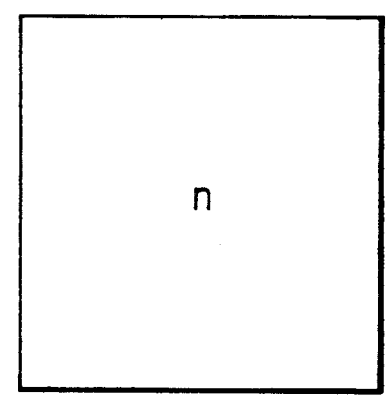

FIGS. 5A and 5B correspond to a grating formation (display) state, and FIGS. 5C and 5D correspond to a grating non-formation (non-display) state.

In FIG. 5A, in portions of the liquid crystal portions, which are regulated by grating walls, the ordinary refractive index $n_o$ and the extraordinary refractive index $n_e$ are present to be perpendicular to each other. In other portions, a mean value between the ordinary and extraordinary refractive indexes $n_o$ and $n_e$ is obtained. Assuming that a constituting material is selected to yield $n=n_o$ over the visible region, the state of FIG. 5A can be considered as follows. That is, a two-dimensional diffraction grating, in which three regions having different refractive indexes n, $n_e$ and $n_o$-$n_e$, are distributed, is formed. With this grating, the incident light 3 is subjected to the diffraction effect, and the intensity of its linear light component (diffracted light component of 0th order) is modulated. Therefore, the grating formation portion can be set in a display state.

A state in which no display is made can be obtained in the liquid crystal 1 having the refractive index anisotropy using a means, such as an electric field, a magnetic field, heat, and the like, for varying optical axes. FIG. 5C shows a refractive index distribution when all the optical axes become perpendicular to the grating surface. If $n=n_o$, the grating has a single refractive index, as shown in FIG. 5D. In FIG. 5C, the incident light 3 is not subjected to optical control and a display is extinguished.

As described above, the diffraction grating 2 of this embodiment has the same function as that of a conventional one-dimensional diffraction grating with respect to one polarized component.

In this embodiment, the diffraction grating is arranged to have the same effect as above in the identical plane with respect to the other polarized component, i.e., a component polarized in a right-and-left direction of the sheet surface, that is, to obtain a 90° rotational symmetry.

In this embodiment, since a diffraction grating which extends in different two directions in an identical plane is formed and is used as a two-dimensional diffraction grating, all the polarized light components can be controlled.

Figure 5E:
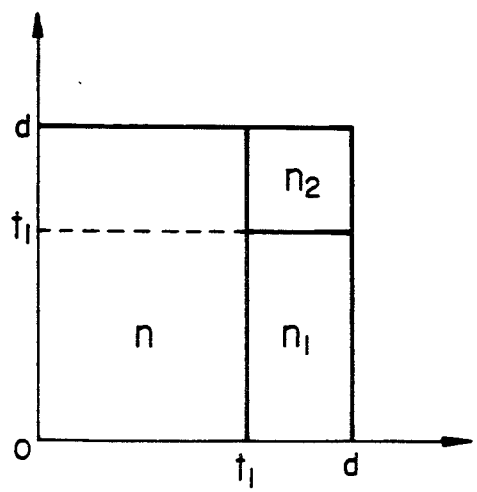

In order to quantitatively express the above principle, the Fraunhofer diffraction of the two-dimensional diffraction grating can be considered for a 0th-order diffraction efficiency when the diffraction grating extending in specific directions indicated by lengths $t_1$, $t_2$, and d in FIG. 5A has a refractive index distribution shown FIG. 5E during one period.

Equation of 0th-order diffraction efficiency $\rho 0(\lambda)$ will be explained below.

If a wavelength is given as $\lambda$, a height of the grating of the diffraction grating is given as T, the grating pitch is given as d, a length of a projecting portion of the grating is given as $t_1$, a ratio $t_1/d$ of the length of the projecting portion to the grating pitch is given as P, and refractive index differences are given as $\Delta n_1 = n_1 - n$ and $\Delta n_2 \times n_2 - n$, the 0th-order diffraction efficiency $\rho 0(\lambda)$ can be expressed as:

$$\eta 0(\lambda) = P^2 + P^2(1-P)^2 + (1-P)^4 + \qquad (1)$$

$$2P(1-P)\left\{ P\cos 2\pi(\Delta n_1 T/\lambda) + (1-P)\cos 2\pi\left(\frac{\Delta n_2 T}{\lambda}\right)\right\} +$$

$$2P(1-P)^3[\cos 2\pi\{(\Delta n_1 - \Delta n_2)T/\lambda\}]$$

Since P=1 in FIG. 5D, $\rho 0(\lambda)=1$ is obtained regardless of a wavelength.

The state shown in FIG. 5B is a case wherein $n_1 = n_e$ and $n < n_2 < n_e$, and $\rho 0(\lambda)$ is determined by the grating height, the refractive index of the constituting material, and the ratio of the projection, and varies within the range of 0 to 1. Equation (1) is an approximate expression if $\lambda << d$. If the grating pitch approximates a wavelength like $d \approx \lambda$, i.e., in the case of the grating pitch of several micrometers (μm), an actual value is deviated a little from the value by equation (1).

Figures 6A, 6B:
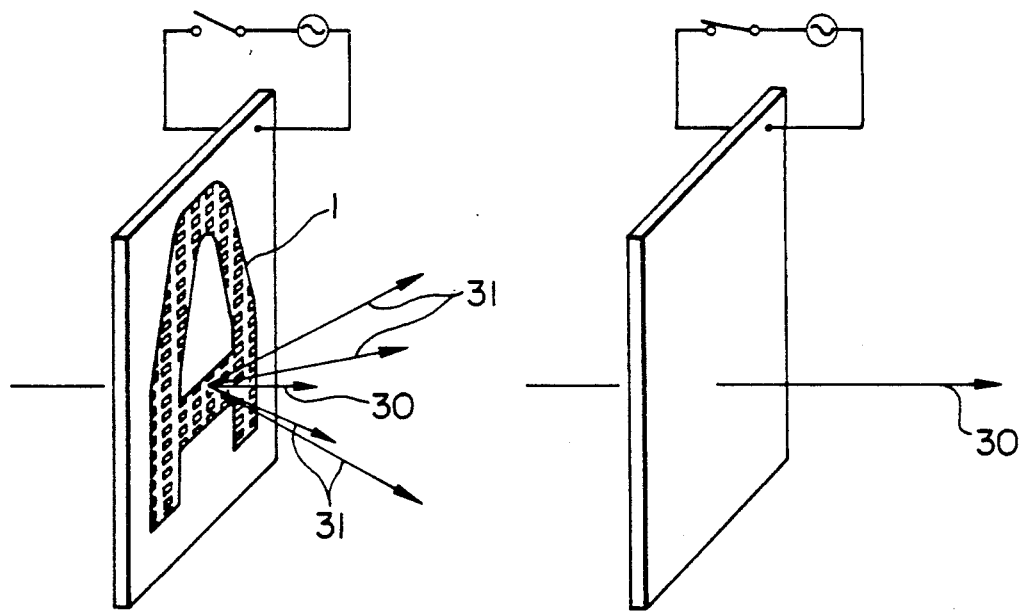
FIGS. 6A and 6B are illustrations showing states wherein a display operation is performed by the apparatus shown in FIG. 4A in practice.

FIGS. 6A and 6B are views for explaining an embodiment wherein a display element of the present invention is used in an actual display operation.

In this embodiment, the grating pitch is 2.0 μm, a height of the grating is 1.5 μm, a ratio of the projecting portion is 0.6, and a positive nematic liquid crystal ($n_o=1.52$, $n_e=1.78$) is sealed in the recesses of the diffraction grating 2.

FIG. 6A illustrates a state wherein no electric field is applied to the liquid crystal 1. This state corresponds to a display state, and a bluish purple display is performed. In this display state, a polarizing plate is arranged between the diffraction grating 2 and a light source (not shown) and is continuously rotated through 180° to polarize incident light. If the display is observed in this state, it is not noticeably changed, and isotropic display is allowed with respect to arbitrarily polarized components.

When an electric field is gradually applied to the liquid crystal 1, the display is gradually extinguished. When a voltage V=10 V, a boundary between a display portion and a non-display portion cannot be visually distinguished from each other, and a transparent state shown in FIG. 6B is established. A contrast of the display apparatus of this embodiment (a ratio of a reciprocal number of the transmission rate of the non-display portion to that of the display portion) is 1:8.

Figure 7:
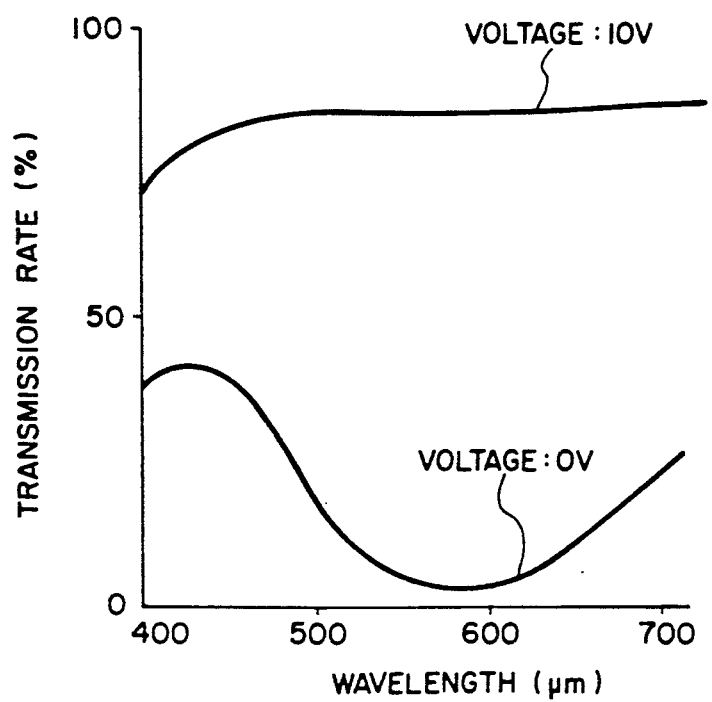
FIG. 7 is a graph showing spectral transmission rate characteristics when an electric field is applied and is not applied to the apparatus shown in FIG. 4A.

FIG. 7 shows a spectral transmission rate of the two-dimensional diffraction grating of the above embodiment when an electric field is applied to the liquid crystal and is not applied thereto.

In the above embodiment, a negative nematic liquid crystal can be used in place of the positive nematic liquid crystal. When no electric field is applied to the liquid crystal, a transparent state is obtained, and when an electric field is applied, a display state is obtained.

In the above embodiment, any other media having a refractive index anisotropy can be used.

Figure 8:
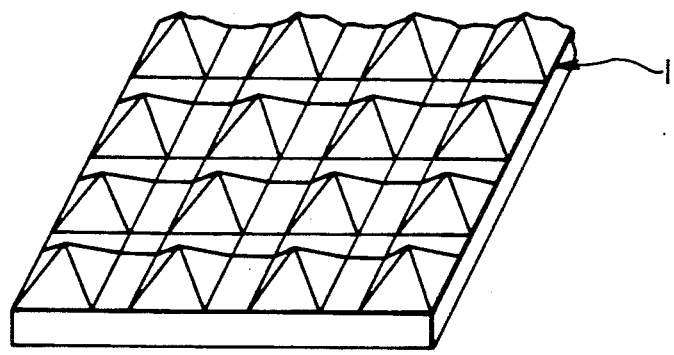
FIG. 8 is a perspective view showing another example of a two-dimensional diffraction grating used in the present invention.

In the diffraction grating according to the present invention, if three-dimensional portions are two-dimensionally and periodically arranged in a plane, they can have any shapes such as a rectangular shape, a polygonal shape, and the like. For example, each three-dimensional portion can comprise a quadrangular prism-like projecting surface as shown in FIG. 8.

In the present invention, the optical axes can be oriented in any form as long as they are oriented to be substantially perpendicular to each other.

Figures 9A, 9B, 9C:
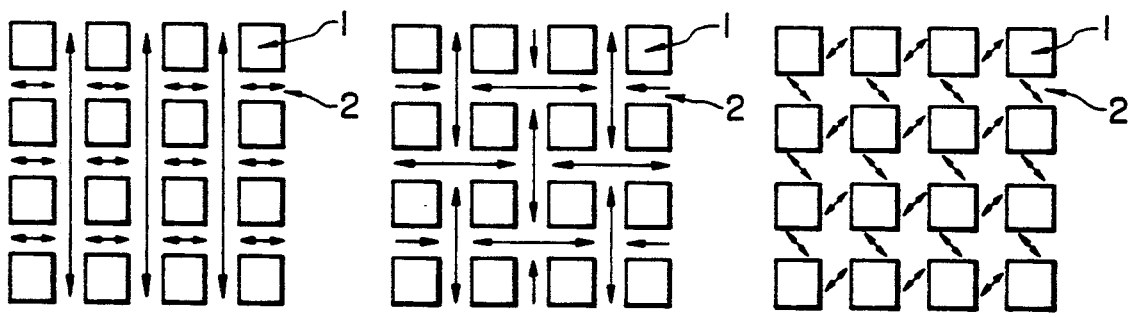
FIGS. 9A to 9E are representations showing various orientation modes of the optical axes of a variable refractive index material in a two-dimensional diffraction grating in which rectangular patterns are two-dimensionally and periodically arranged.
Figures 9D, 9E:
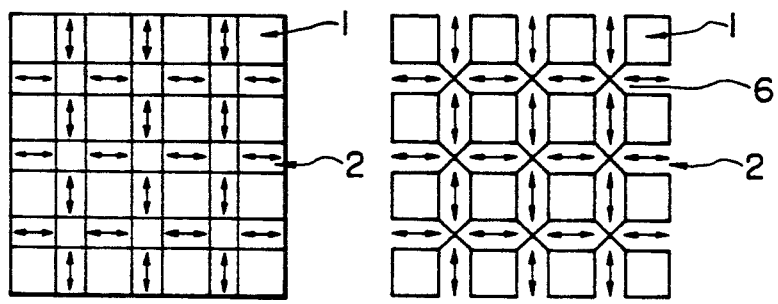

FIGS. 9A to 9E show an embodiment of optical axis orientation of a medium having a refractive index anisotropy, which is filled in recesses of the diffraction grating according to the present invention. In FIGS. 9A to 9E, arrows indicate directions of optical axes. FIG. 9A shows a case wherein an optical axis in one direction is oriented to have a priority over an optical axis in the other direction. FIGS. 9B and 9C show cases wherein optical axis orientation is modified. FIGS. 9D and 9E show cases wherein two optical axes are separated from each other, in which FIG. 9D shows a case wherein the shape of the diffraction grating is modified, and FIG. 9E shows a case wherein a spacer is formed.

Since the display apparatus of the present invention can be controlled with respect to a multi-color light source, it can be used together with any type of light source.

Since the above-mentioned display apparatus has a color display function and a color changing function in the diffraction grating itself, color display can be independently performed by the diffraction grating. For example, the diffraction grating performs only light amount control, and display can be performed using another two-dimensional means, such as an absorption type color filter.

According to this embodiment, when a single diffraction grating which consists of three-dimensional portions having a two-dimensional periodic structure and a medium having predetermined optical axes and refractive index anisotropy is used, a simple optical display apparatus which can obtain the same effect as in two diffraction gratings and has high light utilization efficiency can be realized.

Since a single diffraction grating portion is used, an optical display apparatus can be realized which does not require strict manufacturing precision such that two diffraction gratings are precisely overlaid.

Figure 10A:
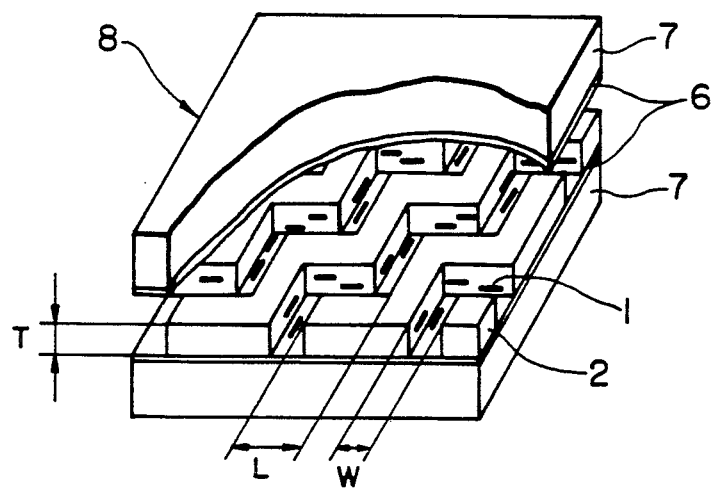
FIG. 10A is a schematic view showing another embodiment of an optical modulation element according to the present invention.

FIG. 10A is a schematic view showing another embodiment of an optical modulation element according to the present invention.

The same reference numerals in FIG. 10A denote the same parts as in the previous embodiments, and a detailed description thereof will be omitted.

The element of this embodiment has basically the same structure as that of the element shown in FIG. 4A. However, as can be seen from comparison between FIGS. 4B and 10B, the structure of the diffraction grating as a main part of the element is different from that in the above embodiment.

Figure 10B:
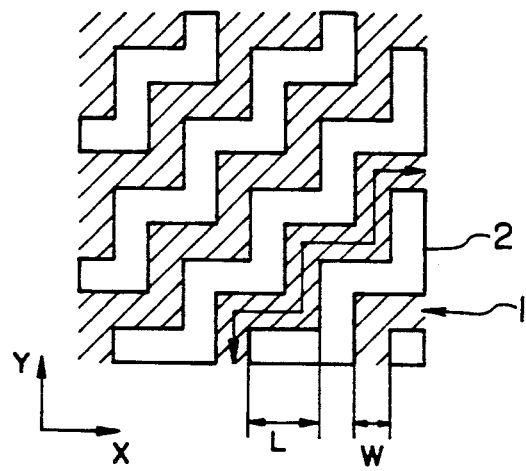
FIG. 10B is a plan view showing the relationship between a diffraction grating and an orientation direction of a liquid crystal in the element shown in FIG. 10A.

More specifically, as shown in the plan view of FIG. 10B, in a diffraction grating 2 according to this embodiment, grating lines have a waveshape in the plane of a substrate 7, and groove directions are continuously changes, so that grooves of the diffraction grating 2 also have a waveshape in the plane of the substrate 7. The directions of the grating grooves are changed through 90° alternately in the X and Y directions.

Normally, in a liquid crystal sealed in grooves of a diffraction grating, its orientation state is influenced by a length L and a width W of the groove.

If the structure of the diffraction grating is determined such that the length L of the groove becomes longer than the width W thereof, the sealed liquid crystal is regulated by the grating grooves and opposing grating side walls, to be horizontally oriented in the direction of length (groove direction) of the groove.

The present inventors experimentally found that orientation of liquid crystal molecules due to fine grooves tended to be shifted from a horizontal orientation state to a so-called inclined orientation state where a longitudinal direction of a molecule was inclined with respect to the substrate surface when the length of the groove in a specific direction became shorter than the width of the groove. For example, in FIGS. 10A and 10B, if a groove width W=0.8 μm and a groove depth T=1.5 μm, liquid crystal molecules sealed in a groove having a length L of 5 μm or less were obliquely oriented.

Therefore, in the optical modulation element according to this embodiment, as shown in FIG. 10B, a groove direction was periodically changed so that grooves defined by the diffraction grating 2 and indicated by hatched portions were continued and had a sufficient effective length. In this manner, the liquid crystal molecules 1 could be horizontally oriented with respect to the substrate.

The orientation directions of the liquid crystal molecules 1 are periodically changed in the X and Y directions in accordance with the groove direction which is periodically changed. Therefore, a two-dimensional diffraction grating which can perform modulation with respect to arbitrarily polarized light components can be prepared as in the optical modulation element shown in FIG. 4A.

The optical modulation element shown in FIGS. 10A and 10B can perform optical modulation of light incident on the element as in the element shown in FIG. 4A, such that a voltage is applied across a pair of transparent electrodes 6 to change the orientation direction of the liquid crystal molecules 1.

Therefore, the substrates 7, the transparent electrodes 6, and a material constituting the diffraction grating 2 are members which are transparent for light to be modulated. When the element of this embodiment is used for a display, the constituting members preferably have substantially transparency with respect to light in a visible region. More specifically, the constituting members have a high transmission rate in a wavelength range of visible light, and more preferably have flat spectral transmission rate characteristics.

When an ordinary refractive index $n_o$ of the liquid crystal 1 sealed in the grooves of the diffraction grating (hatched portion in FIG. 10B) and a refractive index n of the diffraction grating 2 are determined to satisfy $n \approx n_o$, the transmission rate can become very high when a voltage is applied to the element to obtain a light transmission state.

As a material for constituting the diffraction grating 2, various materials such as photoresist, glass, thermosetting resin, photosetting resin, and the like can be used.

A detailed example in which the optical modulation element shown in FIGS. 10A and 10B was prepared as a transmission type optical modulation apparatus, and the experiments were conducted, will be described hereinafter.

An ITO film as the transparent electrode 6 was formed on a glass substrate, and a resist (refractive index $n_g \approx 1.52$) which was transparent with respect to visible light was applied on the ITO film. Thereafter, the diffraction grating having a structure shown in FIG. 10B was formed by the photolithography technique so as to obtain: a depth T=1.5 μm; a width W of a groove=0.75 μm; and a length L of a groove=2.25 μm.

A nematic liquid crystal 1 having a positive dielectric anisotropy was sealed in the grooves of the diffraction grating 2. Then, the diffraction grating 2 was clamped using another glass substrate having another ITO film, such that the ITO film faced the diffraction grating 2.

The positive nematic liquid crystal used herein was a liquid crystal having an ordinary refractive index $n_o = 1.52$, an extraordinary refractive index $n_e = 1.78$, and a refractive index difference $\Delta n = 0.26$.

Lead wires were then connected to the ITO films of the opposing glass substrates, and were connected to a power source, thereby preparing the optical modulation apparatus.

When light components that were polarized in random directions were incident on the apparatus, in a voltage non-application state (in a state wherein the liquid crystal 1 were horizontally oriented), the incident light did not depend on the polarization direction, and was influenced and diffracted by the diffraction grating. In this state, an amount of diffracted light components of 0th order transmitted through the element was greatly reduced.

When a voltage was applied to the ITO films through the lead wires (in a state wherein the liquid crystal molecules 1 were vertically oriented with respect to the substrate surface), the amount of diffracted light components of 0th order transmitted through the element was gradually increased upon an increase in voltage. When the voltage V=10 (V), substantially the total transmission state was established.

Figure 10C:
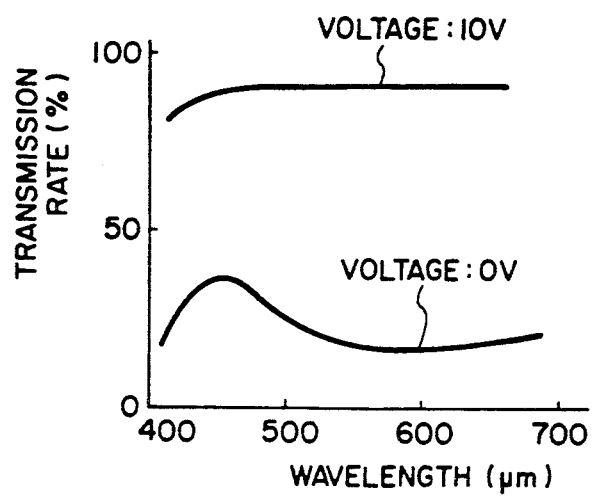
FIG. 10C is a graph showing spectral transmission rate characteristics when an electric field is applied and is not applied to a modulation apparatus using the element shown in FIG. 10A.
Figure 11A:
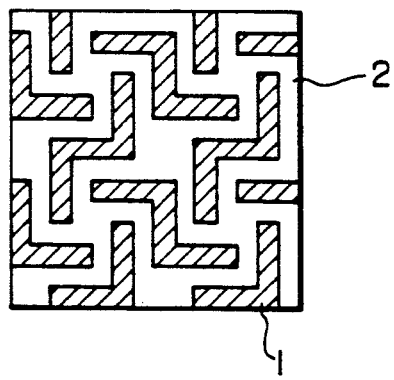
FIGS. 11A to 11F are plan views showing other examples of the diffraction grating shown in FIG. 10B.
Figure 11B:
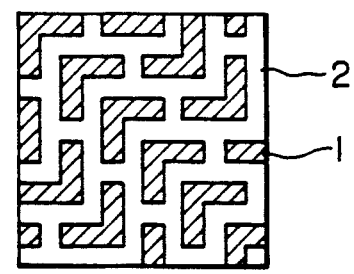
Figure 11C:
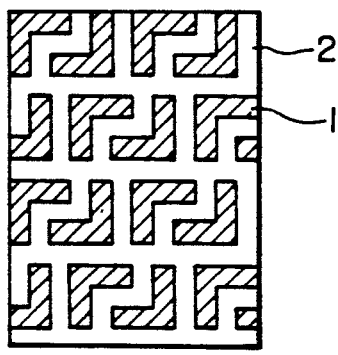
Figure 11D:
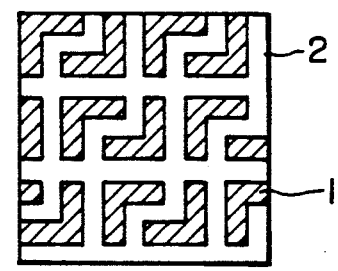
Figure 11E:
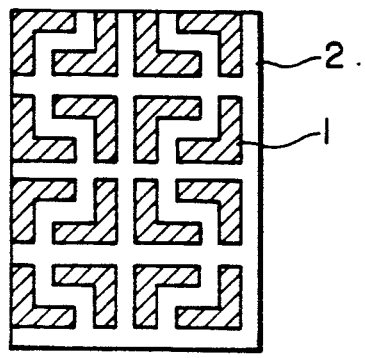
Figure 11F:
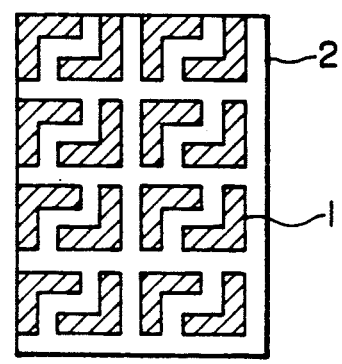

FIG. 10C shows a spectral transmission rates of the diffracted light components of 0th order transmitted through the element at the voltage V=0 (V) and at 10 (V) in the above optical modulation apparatus.

Another detailed example will be described below.

An ITO film as the transparent electrode 6 was formed on a glass substrate. Glass ($n_g \approx 1.52$) was evaporated by electron beam heating and was deposited on the ITO film by electron beam heating to obtain a 1.7 - μm thick glass film. A waveshaped pattern as shown in FIG. 10B (a width W of a groove=0.75 μm; a length L of the groove=2.25 μm) was formed on the glass film using a resist. Thereafter, the deposited glass film was selectively removed by the dry etching method to form a groove having a depth T=1.5 μm. The resist pattern was then removed to prepare a two-dimensional diffraction grating formed of glass.

After a positive nematic liquid crystal was sealed in the grooves of the diffraction grating, the diffraction grating was clamped using another glass substrate having an ITO film thereon, and the ITO films of the substrates were connected to a power source through lead wires.

Following the same procedures as in the above-mentioned example, the performance of the prepared optical modulation apparatus was evaluated. The resultant spectral transmission rate characteristics under the presence/absence of the voltage application are also as shown in FIG. 10C.

FIGS. 11A to 11F are plan views showing other structures of the two-dimensional diffraction gratings used in the present invention.

In each of FIGS. 11A to 11F, a diffraction grating 2 corresponds to projections of a three-dimensional relief pattern. Reference numeral 1 denotes a liquid crystal or grooves of the diffraction grating 2 and indicates a member or a portion corresponding to recesses of the three-dimensional relief pattern.

In the grooves of the diffraction grating 2 indicated by the hatched portions, liquid crystal molecules of the liquid crystal 1 sealed in the grooves are oriented along the long side of the pattern indicated by the hatching portions.

Therefore, diffraction gratings having various structures as shown in FIGS. 11A to 11F can be prepared, and the liquid crystal molecules 1 are two-dimensionally oriented in the horizontal direction, thereby preparing optical modulation elements which can modulate light having arbitrary polarization characteristics.

As described above, since the two-dimensional diffraction grating is formed in an identical plane, the optical modulation elements shown in FIGS. 10A to 11F can always perform optical modulation regardless of a polarization state of incident light while maintaining a low-profile compact structure having a small cell thickness.

Since the cell thickness is small, the following advantage can also be provided. More specifically, when a refractive index of a variable refractive index medium having an optical anisotropy is controlled by voltage application, a lower application voltage can be applied as compared to a conventional element.

The optical modulation elements shown in FIGS. 10A to 11F can reliably control orientation of the liquid crystal molecules since the diffraction grating portion is continuously formed, unlike in the optical modulation element shown in FIG. 4A. In addition, since the width of the groove and the length in the groove direction have a predetermined relationship (i.e., length L > width W), the liquid crystal molecules sealed in the grooves can be horizontally oriented as a whole.

Figure 12A:
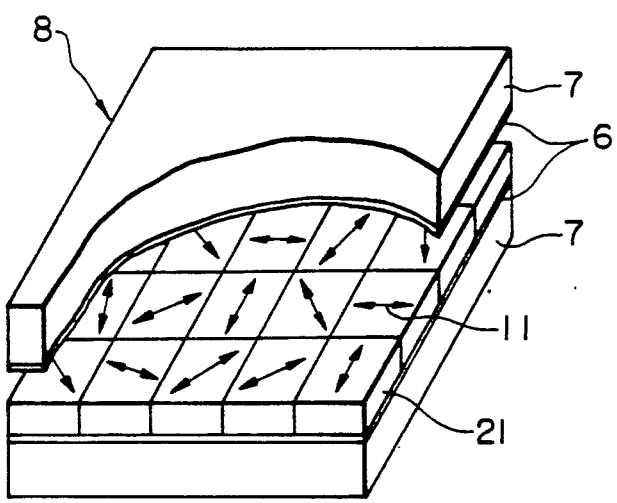
FIG. 12A is a schematic perspective view of still another embodiment of an optical modulation element according to the present invention.

FIG. 12A shows still another embodiment of an optical modulation element according to the present invention.

In FIG. 12A, the element of this embodiment includes transparent electrodes 6 and transparent substrates 7. In each of diffraction grating blocks 21, a groove is formed in a specific direction. The grating groove direction of each block is indicated by an arrow 11. The direction indicated by the arrow 11 also represents an orientation direction of liquid crystal molecules sealed in the block 21.

Figure 12B:
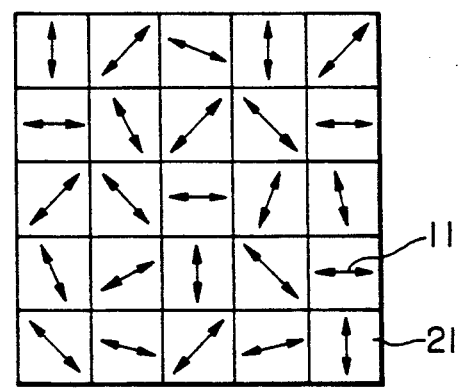
FIG. 12B is a plan view showing orientation directions of liquid crystal molecules in blocks constituted by rectangular grooves formed by a diffraction grating in the element shown in FIG. 12A.

FIG. 12B is a plan view illustrating the diffraction grating blocks formed in the optical modulation element 8 and the grating groove directions of the respective blocks, i.e., orientation directions 11 of the liquid crystal molecules.

As can be seen from FIG. 12B, in the optical modulation element according to this embodiment, an optical modulation portion is divided into a plurality of blocks 21, and the grating groove directions of the adjacent diffraction gratings constituting the blocks 21 are different from each other, so that the orientation directions of the liquid crystal molecules are randomly arranged.

Each diffraction grating block 21 in this embodiment consists of a 30 $\mu$m square. The blocks 21 are two-dimensionally arranged in a predetermined order to constitute the optical modulation portion.

The arrow 11 described above indicates a direction of a vector obtained by averaging orientation directions of a plurality of molecules of the liquid crystal sealed in the groove of each block 21. In practice, the liquid crystal molecules in the groove are rarely oriented perfectly in the identical direction.

In FIG. 12A, the transparent substrates 7 are glass substrates, and are substantially transparent in a used wavelength range. The transparent electrodes 6 are formed of ITO or $SnO_2$, and are also substantially transparent in the used wavelength range.

As the diffraction grating constituting each block 21, a transparent resist or a glass material is used. As the liquid crystal, RO-TN403 (available from Rosche Company: a positive dielectric anisotropic nematic liquid crystal) can be used.

The characteristic feature of the optical modulation element of this embodiment is that the orientation directions (optical axis directions) of the liquid crystal molecules are random in the modulation portion. For this reason, the diffraction grating can always be functioned regardless of the polarization characteristics of incident light, and arbitrary light can be modulated.

When the groove direction of the diffraction grating, in other words, the orientation directions of the liquid crystal molecules are two-dimensionally determined as in the elements shown in the previous embodiments, and if the orientation of the liquid crystal is left incomplete, modulation properties may be changed depending on the polarization directions of incident light.

In contrast to this, as in this embodiment, since the liquid crystal molecules are randomly oriented in advance, even if the orientation of the liquid crystal in each block 21 fluctuates, the optical modulation element as a whole will not be influenced thereby. Therefore, an element can always effect a substantially identical modulation function regardless of the polarized state of incident light.

The optical modulation element shown in FIG. 12A can control orientation of the liquid crystal when a predetermined voltage is applied across the transparent electrodes 6. Under this control, the characteristics of the diffraction gratings as the blocks 21, e.g., modulation efficiency, a spectral transmission rate, and the like are changed to perform optical modulation.

Assume that the diffraction gratings as the blocks 21 are formed of an identical material, and its refractive index is given as $n_g$. When an ordinary refractive index $n_o$ of a liquid crystal (e.g., RO-TN403) is index-matched with the refractive index $n_g$, the liquid crystal molecules can be vertically oriented with respect to the surfaces of the substrates 7 upon voltage application, and total transmission can be established.

Figure 12C:
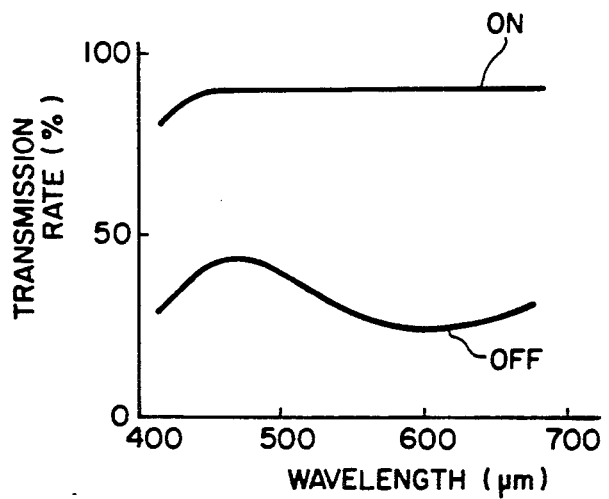
FIG. 12C is a graph showing spectral transmission rate characteristics when an electric field is applied and is not applied to an optical modulation apparatus using the element shown in FIG. 12A.

FIG. 12C shows spectral transmission rate characteristics of an element when an electric field is applied to the element (ON) shown in FIG. 12A and when no electric field is applied thereto (OFF).

As shown in FIG. 12C, a transmission rate near 90% can be obtained throughout the used wavelength range when the electric field is ON. When the electric field is OFF, the spectral transmission rate shown in FIG. 12C is obtained. Therefore, if visible light having a wavelength of $\lambda = 400$ to 700 $\mu$m is used as light to be modulated, a white-color display can be performed when the electric field is ON, and a color display corresponding to a predetermined spectral transmission rate can be performed when the electric field is OFF.

According to this embodiment, when such a display is performed, stable contrast can be obtained regardless of the polarized state of incident light, and display quality can be improved.

In the optical modulation element of this embodiment, since the two-dimensional diffraction grating can be formed in a predetermined plane, the element can be easily manufactured, and can be of low-profile. In addition, a low application voltage can be used as compared to a conventional element, and a low-power consumption optical modulation element can be realized.

Since the size of each block 21 is small (i.e., 30 μm square), the blocks 21 cannot be visually identified. Therefore, there is no problem if the element of this embodiment is applied to a display element.

The present inventors examined in consideration of identification of the blocks 21, easy manufacture, and the stable modulation function, and concluded that the size (area) of each block 21 preferably fell within the range of 100 $\mu m^2$ to 1,000 $\mu m^2$.

Figure 13A:
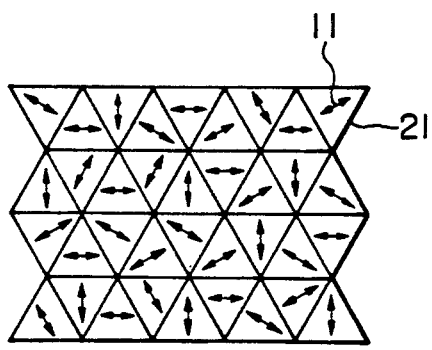
FIGS. 13A and 13B are plan views showing another example of groove blocks constituted by the diffraction grating shown in FIG. 12B.
Figure 13B:
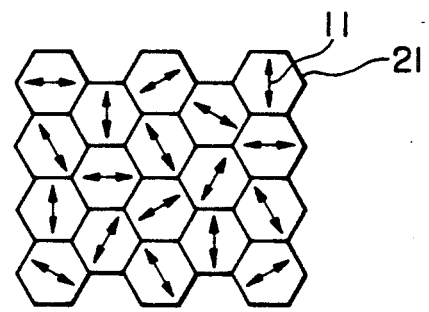

FIGS. 13A and 13B are plan views of other structures of diffraction grating blocks 21 of the optical modulation element shown in FIGS. 12A and 12B.

In FIGS. 13A and 13B, each block 21 serves as a diffraction grating. A direction of a grating groove of each block 21 or an orientation direction of liquid crystal molecules sealed in the groove is indicated by an arrow 11.

In FIG. 13A, each block 21 has a triangular shape, and in FIG. 13B, each block 21 has a hexagonal shape. As a matter of fact, the groove directions of a plurality of blocks 21 of FIGS. 13A and 13B are random as a whole, and the same effect as in the element shown in FIGS. 12A and 12B can be provided.

As described above, the shape of each block 21 has no limitations to this embodiment.

In order to maximize modulation efficiency a gap between adjacent blocks 21 must be decreased as small as possible. As shown in FIGS. 12B, 13A, and 13B, the blocks 21 must be arranged at a high density.

For this purpose, each block 21 preferably has a polygonal shape, and this facilitates its manufacturing process.

In the above embodiments, a liquid crystal has been exemplified as a variable refractive index material. Various other variable refractive index materials having an optical anisotropy can be applied to the present invention.

The diffraction grating can select various grating sectional shapes, such as a rectangular grating section, a triangular grating section, a sine-wave like grating section, and the like. In particular, a diffraction grating having a rectangular section has good spectral characteristics, and is best suited for color display. To the contrary, a diffraction grating having a triangular or sine-wave section has flat spectral characteristics, and is best suited for black-and-white display or an optical switch independently of a wavelength.

In the optical modulation element according to the present invention, refractive indexes of a diffraction grating and a variable refractive index material are matched as described in the previous embodiments, thereby obtaining a total transmission state regardless of the polarized state of incident light. This state can correspond to a non-display state in the display element. Therefore, the optical modulation element is very effective in use of the display element of this type in terms of light utilization efficiency, high contrast, and the like.

For example, if the element of the present invention is applied to a display element in a viewfinder of a camera, light from an object is totally transmitted in a non-display state, and a display pattern can be superimposed on an object image in a display state. Thus, very exciting intra-finder display can be performed.

Unlike the conventional liquid crystal display element, since the element of the present invention requires no polarizing plate or the like, a display function can be provided while a viewfinder is kept bright.

What we claim is:

1. An optical modulation element comprising:
    a first substrate;
    a second substrate arranged at a position separated from said first substrate at a predetermined distance;
    a pattern defining recesses formed between said first and second substrates, said pattern having a periodic construction forming recesses in a first direction in one plane and forming recesses in a second direction which is different from said first direction and on the same plane as the recesses in said first direction; and
    an optical anisotropic medium which is sealed in the recesses of said pattern, a first portion of said medium being sealed by the recesses extending in said first direction and a second portion being sealed by the recesses extending in said second direction, said anisotropic medium having optical axes having directions which are defined according to said first and second directions and differ from each other, whereby said medium and said pattern together form a phase-type diffraction grating.

2. An optical modulation element according to claim 1, wherein said relief pattern is composed of a checkerboard-like pattern having regularly-spaced squares.

3. An optical modulation element according to claim 1, wherein said relief pattern is composed of plural areas having patterns with periodic constructions in directions which differ from each other.

4. An optical modulation element comprising:
    first and second substrates, said substrates being separated from each other at a predetermined distance;
    a pattern defining recesses formed between said first and second substrates, said pattern having a periodic
    a first substrate;
    a second substrate arranged at a position separated from said first substrate at a predetermined distance;
    a pattern defining recesses formed between said first and second substrates, said pattern having a periodic construction forming recesses in a first direction in one plane and forming recesses in a second direction which is different from said first direction and on the same plane as the recesses in said firs direction; and
    an optical anisotropic medium which is sealed in the recesses of said pattern, a first portion of said medium being sealed by the recesses extending in said first direction and a second portion being saddled by the recesses extending in said second direction, said anisotropic medium having optical axes having directions which are defined according to said first and second directions and differ from each other, whereby said medium and said pattern together form a phase-type diffraction grating.

5. An optical modulation element according to claim 4, wherein said relief pattern is composed of a checkerboard-like pattern having regularly-spaced squares.

6. An optical modulation element according to claim 4, wherein said relief pattern is composed of plural areas having patterns with periodic constructions in directions which differ from each other.

7. An optical modulation element according to claim 4, wherein said first and second recesses are fluidly connected with each other.

8. An optical modulation element according to claim 4, wherein each of said first and second substrates, said liquid crystal, said relief pattern and said electrode members are transparent to incident light.

9. An element according to claim 4, wherein a refractive index of said pattern is equal too that of each liquid crystal molecule when each said liquid crystal molecule of each said portion is directed toward a direction perpendicular to a surface of each of said substrates.

10. An element according to claim 4, wherein the changing means directs each said liquid crystal molecule of each said portion toward the perpendicular direction.

11. An element according to claim 4, wherein said pattern is formed by periodically arranging a zigzag pattern in a predetermined direction different from each said direction, and wherein said recesses extending in said first and second directions are alternately formed between each zigzag pattern.

12. An element according to claim 4, wherein depths of said recesses and height of a liquid crystal layer sealed between each of said substrates are substantially equal to each other.

13. An element according to claim 4, wherein said pattern defining recesses is formed on one of said substrates.

14. An element according to claim 4, wherein the changing means includes means for applying an electric field to said liquid crystals of said portions.

15. An optical modulation element comprising two types of periodic recesses with an optical anisotropic medium sealed between a pair of substrates for diffracting incident light toward said element by a phase-type diffraction grating comprising said periodic recesses and said medium, wherein:
said two types of periodical recesses are coplanar and formed in directions which are substantially perpendicular to each other, said plane being parallel to the substrate surfaces of said substrates; and
said phase-type diffraction grating diffracts polarized components of said incident light which are substantially perpendicular to each other, and wherein one of said components is diffracted by said phase-type diffraction grating formed by one of said two types of periodical recesses and said medium and the other of said components is diffracted by said phase-type diffraction grating formed by the other of said two types of periodical recesses and said medium.

16. An element according to claim 15, wherein said direction has optical axes and
(i) a predetermined portion of said medium is sealed by recesses formed along one of said directions; and the optical axis of said predetermined portion is directed toward the one direction in a predetermined state, and
(ii) a portion of said medium other than said predetermined portion is sealed by recesses formed along the other portion is directed toward the other direction in said predetermined state.

17. An element according to claim 16, further comprising electrode means for applying voltage for changing said optical axes of said portions of said medium so as to adjust refractive indexes thereof.

18. An element according to claim 17, wherein said medium comprises a liquid crystal, and molecules of said liquid crystal at each of said portions are arranged in a direction corresponding to each said portion.

19. An element according to claim 17, wherein the electrode means is able to make the directions of said optical axes of each said portion substantially perpendicular to each of said substrate surfaces in a state other than said predetermined state, and wherein said predetermined portion and said portion other than said predetermined portion have the same refractive indexes.

20. An element according to claim 19, wherein said member is formed by arranging a zigzag pattern in another predetermined direction different from each said direction.

21. An optical modulation element comprising:
first and second substrates, said substrates being separated from each other at a predetermined distance;
a pattern defining a plurality of grooves formed between said first and second substrates, said pattern being formed by arranging a plurality of zigzag patterns in a predetermined direction, wherein a groove extending in a first direction and a groove extending in a second direction substantially perpendicular to said first direction are alternately formed between each of said zigzag patterns;
a liquid crystal layer sealed between said first and second substrates, wherein a first portion of said liquid crystal layer is sealed by said groove extending in said first direction, and liquid crystal molecules of said first portion are arranged along said first direction in a predetermined state, and wherein a second portion of said liquid crystal layer is sealed by said groove extending in said second direction and liquid crystal molecules of said second portion are arranged along said second direction in said predetermined state; and
electrode means for applying voltage changing arrangement directions of liquid crystal molecules of each of said portions so as to change a refractive index of said liquid crystal layer.

22. An element according to claim 21, wherein depths of said plurality of grooves and a height of said liquid crystal layer are substantially equal to each other.

23. An element according to claim 22, wherein a refractive index of each of said portions and that of a material forming said pattern are substantially equal to each other in a state where said liquid crystal molecules are each of said portions are arranged in a direction substantially perpendicular to a substrate surface of each of said substrates.

24. An optical modulation device comprising a pair of substrates, a pattern formed to arrange a plurality of recesses between said pair of substrates, an optical anisotropic medium sealed between said plurality of recesses, and means for changing directions of optical axes of said medium in such a manner that in a first state, said medium and said pattern have substantially matched refractive indexes and in a second state, said medium and said pattern have mismatched refractive indexes, and further in the first state, an incident light beam is substantially transmitted through said optical device without being diffracted and in the second state, said incident light beam is scattered, said optical modulation device comprising said plurality of recesses constituted in combination with recesses extending in directions different from each other along a common plane.

25. A device according to claim 24, wherein said medium comprises a liquid crystal.

26. A device according to claim 24, wherein said combination of said recesses constitutes a grating.

27. A device according to claim 24, wherein said directions include directions perpendicular to each other.

28. A device according to claim 24, wherein said directions are randomly set up.

29. A device according to claim 26, 27 or 28, wherein said pattern is set up so as to regularly form said plurality of recesses so that said incident light beam may be scattered with being refracted in the second state.

* * * * *

UNITED STATES PATENT AND TRADEMARK OFFICE
CERTIFICATE OF CORRECTION

PATENT NO. : 5,148,302

DATED : September 15, 1992

INVENTOR(S) : AKIHIKO NAGANO ET AL.

It is certified that error appears in the above-identified patent and that said Letters Patent is hereby corrected as shown below:

TITLE PAGE,

AT [73] ASSIGNEE

Insert,
--[73] Assignee: Canon Kabushiki Kaisha, Tokyo, Japan--.

AT [56] REFERENCES CITED

Insert,
--Attorney, Agent, or Firm—Fitzpatrick, Cella, Harper & Scinto--.

COLUMN 5

Line 26, "$n_g \cdot n_o,$" should read --$n_g \neq n_o,$--.
Line 42, "components and 52." should read --components 51 and 52.--.
Line 43, "liquid crystal" should read --liquid crystal 1,--.
Line 59, "FIG. 3B" should read --FIG. 3A,--.

COLUMN 6

Line 28, "refractive index ne" should read --refractive index $n_e$--.
Line 34, "$n_g \cdot (n_e+n_o)/2,$" should read --$n_g \neq (n_e+n_o)/2$--.

COLUMN 8

Line 59, "$\rho 0(\lambda)$" should read --$\eta 0(\lambda)$--.
Line 67, "$\Delta n_2 x n_2 - n,$" should read --$\Delta n_2 = n_2 - n,$--.
Line 68, "$\rho 0(\lambda)$" should read --$\eta 0(\lambda)$--.

UNITED STATES PATENT AND TRADEMARK OFFICE
CERTIFICATE OF CORRECTION

PATENT NO. : 5,148,302

DATED : September 15, 1992

INVENTOR(S) : AKIHIKO NAGANO ET AL.    Page 2 of 3

It is certified that error appears in the above-identified patent and that said Letters Patent is hereby corrected as shown below:

COLUMN 9

Line 9, "$\rho 0(\lambda)=1$" should read --$\eta 0(\lambda)=1$--.
Line 12, "$\rho 0(\lambda)$" should read --$\eta 0(\lambda)$--.

COLUMN 16

Line 35, "odic" should read
--odic
  construction forming said recesses in one plane in both a first direction and a second direction which is substantially perpendicular to said first direction;
  a liquid crystal which is sealed in the recesses of said pattern, a first portion of said liquid crystal being sealed by the recesses extending in said first direction and a second portion of said liquid crystal being sealed by the recesses extending in said second direction, wherein molecules of the liquid crystal of said first portion are arranged in directions along said first direction and molecules of the liquid crystal of said second portion are arranged along said second direction, wherein said liquid crystal and said pattern together form a phase-type diffraction grating; and
  electrode means for applying voltage for changing the arrangement directions of said liquid crystal molecules of said first and second portions.--.

Lines 36-56 should be deleted.

UNITED STATES PATENT AND TRADEMARK OFFICE
CERTIFICATE OF CORRECTION

PATENT NO. : 5,148,302
DATED : September 15, 1992
INVENTOR(S) : AKIHIKO NAGANO ET AL.

Page 3 of 3

It is certified that error appears in the above-identified patent and that said Letters Patent is hereby corrected as shown below:

COLUMN 17

Line 4, "too" should read --to--.
    Line 8, "claim 4," should read --claim 9,--.
    Line 32, "periodical recesses" should read
        --periodic recesses--.
    Line 54, "along" should read
        --along the other of said directions and
          the optical axis of--.

COLUMN 18

Line 38, "are" should read --of--.

Signed and Sealed this

Twenty-seventh Day of April, 1993

Attest:

MICHAEL K. KIRK

Attesting Officer      Acting Commissioner of Patents and Trademarks